United States Patent [19]

Iwawaki

[11] Patent Number: 4,471,434
[45] Date of Patent: Sep. 11, 1984

[54] TWO MODE ELECTRONIC CASH REGISTER

[75] Inventor: Yasutaka Iwawaki, Kashihara, Japan

[73] Assignee: Sharp Kabushiki Kaisha, Osaka, Japan

[21] Appl. No.: 322,712

[22] Filed: Nov. 18, 1981

[30] Foreign Application Priority Data

Nov. 26, 1980 [JP] Japan .................................. 55-167119

[51] Int. Cl.³ .............................................. G06F 15/20
[52] U.S. Cl. .................................... 364/405; 364/900; 364/406
[58] Field of Search ............................... 364/405–408, 364/700, 404

[56] References Cited

U.S. PATENT DOCUMENTS 4,186,439 1/1980 Shimura et al. ...................... 364/405
4,293,915 10/1981 Carpenter et al. .................. 364/493

FOREIGN PATENT DOCUMENTS 2318678 1/1975 Fed. Rep. of Germany ...... 364/405

Primary Examiner—Gareth D. Shaw
Assistant Examiner—Thomas G. Black
Attorney, Agent, or Firm—Birch, Stewart, Kolasch & Birch

[57] ABSTRACT

An electronic cash register operates either in a one clerk operation mode or in a two clerk operation mode wherein a first clerk performs the normal registration operation and a second clerk performs the resetting (accountant) operation. The electronic cash register includes a timepiece for automatically placing the electronic cash register in the two clerk operation mode when the current time reaches a preselected time.

4 Claims, 1 Drawing Figure

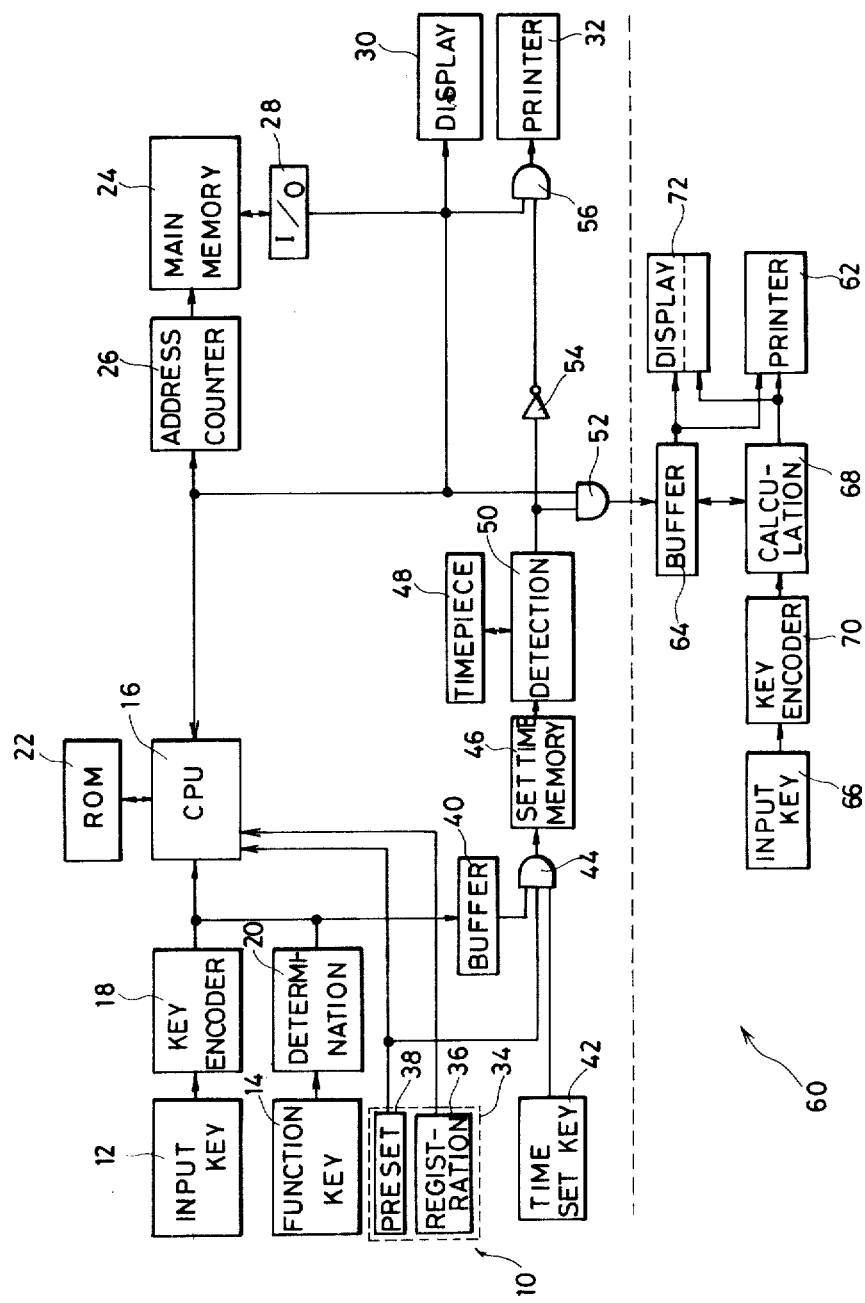

TWO MODE ELECTRONIC CASH REGISTER

BACKGROUND AND SUMMARY OF THE INVENTION

The present invention relates to an electronic cash register and, more particularly, to a control system for varying the operation of a cash register depending on the time information in an electronic cash register.

Recently, an electronic cash register has been developed which includes a registration section operated by a first clerk for registering transaction data such as unit cost information and commodity number information, and a resetting section (accountant) operated by a second clerk for introducing numeral data of the amount tendered from the customer and calculating the change to be handed to the customer. Such an electronic cash register is effective to treat a large number of customers in a short time. However, the above-mentioned system is ineffective troublesome at a time when the store is not crowded.

Accordingly, an object of the present invention is to improve an electronic cash register.

Another object of the present invention is to provide a control system for operating an electronic cash register in different two operation modes, namely, a one clerk mode and a two clerk mode.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic cash register includes a first section having a first key input unit and a first printer unit for conducting the normal registration operation, and a second section having a second key input unit and a second printer unit for conducting the resetting (accountant) operation. A timer preset system is included in the electronic cash register for automatically placing the electronic cash register in a two clerk operation mode at a preselected time, wherein the first and second sections are operative, and in a one clerk operation mode at another preselected time, wherein the first section conducts both the normal registration operation and the resetting (accountant) operation.

BRIEF DESCRIPTION OF THE DRAWING

The present invention will be better understood from the detailed description given hereinbelow and the accompanying drawing which is given by way of illustration only, and thus is not limitative of the present invention and wherein:

The single drawing FIGURE is a block diagram of an embodiment of an electronic cash register of the present invention.

DESCRIPTION OF THE PREFERRED EMBODIMENTS

An electronic cash register of the present invention includes a registration operation section 10 and a resetting (accountant) operation section 60. The registration operation section 10 comprises a key input panel 12 for introducing transaction data such as unit cost information, commodity number information and money amount tendered from the customer, and a function key panel 14 for providing operation instructions to the electronic cash register. The numeral data introduced from the key input panel 12 is applied to a central processor unit 16 via a key encoder 18. The function instruction derived from the function key panel 14 is also applied to the central processor unit 16 via a key determination circuit 20. The central processor unit 16 performs various functions inclusive of the arithmetic calculation on the introduced transaction data in accordance with microprograms stored in a read only memory 22. The transaction data treated by the central processor unit 16 is memorized in a preselected memory section in a main memory 24 through the use of an address counter 26 and an input/output control circuit 28. The transaction data is also applied to a digital display unit 30 and a printer unit 32 for printing out the transaction data onto a journal paper and/or a receipt slip as is well known in the art. The registration operation section 10 further comprises a mode selection switch 34 which has a normal registration mode key 36 and a preset mode key 38. The normal registration mode key 36 is actuated to place the electronic cash register in the normal registration operation mode. The preset mode key 38 is actuated to place the electronic cash register in a preset mode wherein various functions are preset.

One of the preset operations is to preset a time period during which the electronic cash register is placed in a two clerk operation mode. As already discussed above, the electronic cash register is placed in the preset mode when the preset mode key 38 is actuated. When a desired preset time data is introduced from the key input panel 12 under the condition where the electronic cash register is placed in the preset mode, the preset time data is introduced into a buffer memory 40 via the key encoder 18. Then, a time set key 42 is actuated to render an AND gate 44 conductive, thereby introducing the preset time data temporarily stored in the buffer memory 40 into a set time memory 46.

The registration operation section 10 further comprises a timepiece 48 for calculating the current time information, and a detection circuit 50 for comparing the preset time data stored in the set time memory 46 with the current time information kept in the timepiece 48. When the current time information is within a time period determined by the preset time data stored in the set time memory 46, the detection circuit 50 develops a high level signal. When the current time information is not within the time period determined by the preset time data stored in the set time memory 46, the detection circuit 50 develops a low level signal.

More specifically, when the current time information is not within the time period determined by the preset time data stored in the set time memory 46, the electronic cash register operates in the one clerk mode. The low level signal derived from the detection circuit 50 functions to make nonconductive an AND gate 52. The low level signal developed from the detection circuit 50 is inverted by an inverter 54, and applied to an AND gate 56, whereby the AND gate 56 is made conductive. Therefore, the printer unit 32 included in the registration operation section 10 operates to print out the transaction data. At this moment, the resetting (accountant) operation section 60 is placed in the off state.

When the current time information is within the time period determined by the preset time data stored in the set time memory 46, the electronic cash register operates in the two clerk mode. The high level signal derived from the detection circuit 50 functions to make conductive the AND gate 52, whereby the resetting (accountant) section 60 is placed in the on state. At this moment, the AND gate 56 is made nonconductive and, therefore, the printer unit 32 included in the registration operation section 10 does not operate. The printing operation is performed by a printer unit 62 included in the resetting (accountant) section 60. The transaction data treated in the registration operation section 10 is applied to a buffer register 64 included in the resetting (accountant) section 60 through the AND gate 52.

The resetting (accountant) section 60 comprises a key input panel 66 for introducing the numeral data of the money amount tendered from the customer. The money amount data introduced through the key input panel 66 is applied to a resetting calculation unit 68 via a key encoder 70. The resetting calculation unit 68 functions to introduce the transaction total amount stored in the buffer register 64 and the money amount data introduced from the key input panel 66, and to calculate the change to be handed to the customer.

The resetting (accountant) section 60 further comprises a digital display unit 72 which displays the transaction data transferred to the buffer register 64, and the money data of the money tendered from the customer and the change to be handed to the customer calculated by the resetting calculation unit 68. The printer unit 62 prints out the transaction data transferred to the buffer register 64 and the money information of the money tendered from the customer and the change to be handed to the customer.

The electronic cash register of the present invention is very effective when the above-mentioned time period is preset at a time period during which the store will be crowded. In such a case, the electronic cash register is automatically placed in the two clerk operation mode during a time period at which the store is crowded. The electronic cash register is automatically placed in the one clerk operation mode when the store is not crowded.

In a preferred mode, the central processor unit 16 is a microprocessor Z-80 manufactured by Sharp Corporation. The read only memory 22 is an LSI 2732 manufactured by Intel Corporation. The resetting calculation unit 68 is a microprocessor Z-80 manufactured by Sharp Corporation.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register selectively operable in a one clerk mode or a two clerk mode comprising:
first keyboard means for introducing data into said cash register;
registration means for recording transaction data including unit cost information and commodity number information and for accumulating a transaction total amount, said registration means being responsive to said transaction data introduced by said first keyboard means;
second keyboard means for introducing data into said cash register;
calculation means for comparing data representative of the amount tendered by a customer with said transaction total amount received from said registration means and for determining the change to be given the customer, said calculation means selectively receiving said amount tendered data from either of said first or second keyboard means;
timepiece means for developing current time information;
set time memory means for storing preselected time data representative of the desired times for operating said cash register in the one clerk mode or the two clerk mode;
detection means responsive to said timepiece means and said set time memory means for comparing the preselected time data with the current time information and developing a clerk mode signal to select said one clerk mode or said two clerk mode; and
control means responsive to said clerk mode signal for disabling said second keyboard means when said one clerk mode is selected and for enabling said second keyboard means to provide said amount tendered data to said calculation means and inhibiting application of amount tendered data from said first keyboard means to said calculation means when said two clerk mode is selected.

2. The cash register of claim 1 further comprising:
first printer means associated with said first keyboard means for printing out said transaction data and;
second printer means associated with said second keyboard means for printing out said transaction data;
said control means disabling said first printer means and enabling said second keyboard means only when said cash register is in said two clerk mode.

3. The cash register of claim 1 wherein said calculation means includes first calculation means operable during said one clerk mode and remote second calculation means spacially juxtaposed with said second keyboard means and operable only during said two clerk mode.

4. The cash register of claim 1 further comprising:
first display means disposed in juxtaposition to said first keyboard means for displaying said transaction data and for displaying said amount tendered data and information indicative of change to be given the customer when said cash register is in said one clerk mode; and
second display means disposed in juxtaposition to said second keyboard means for displaying, when in said two clerk mode, said transaction data, said amount tendered data, and information indicative of change to be given the customer.

* * * * *